US008734190B2

(12) United States Patent
Schlitzkus et al.

(10) Patent No.: US 8,734,190 B2
(45) Date of Patent: May 27, 2014

(54) DEVICE FOR ELECTRICALLY CONTACTING ELECTRONIC UNITS

(71) Applicant: Robert Bosch GmbH, Stuttgart (DE)

(72) Inventors: Michael Schlitzkus, Dietmannsried (DE); Christian Pfleger, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 13/667,500

(22) Filed: Nov. 2, 2012

(65) Prior Publication Data

US 2013/0115802 A1    May 9, 2013

(30) Foreign Application Priority Data

Nov. 7, 2011   (DE) .......................... 10 2011 085 856

(51) Int. Cl.
*H01R 13/24* (2006.01)
(52) U.S. Cl.
USPC ............................................ 439/700; 439/66
(58) Field of Classification Search
USPC ................ 439/65, 66, 374, 380, 660, 700
See application file for complete search history.

(56) References Cited

U.S. PATENT DOCUMENTS

| | | | | |
|---|---|---|---|---|
| 8,262,419 B2 * | 9/2012 | Chen et al. | ..................... | 439/700 |
| 8,337,256 B1 * | 12/2012 | Lin | ............... | 439/700 |
| 8,408,946 B1 * | 4/2013 | Sochor | ......................... | 439/700 |
| 8,556,639 B2 * | 10/2013 | Ueyama | ........................ | 439/66 |
| 8,562,380 B2 * | 10/2013 | Li | ................ | 439/700 |

FOREIGN PATENT DOCUMENTS

| | | |
|---|---|---|
| DE | 199 17 941 A1 | 10/2000 |
| DE | 10 2008 040 173 A1 | 1/2010 |

\* cited by examiner

*Primary Examiner* — Khiem Nguyen
(74) *Attorney, Agent, or Firm* — Maginot, Moore & Beck

(57) ABSTRACT

A device for electrically contacting a first electronic unit with a second electronic unit includes a guiding unit, at least one first contact unit that is guided in the guiding unit, and a second contact unit. The contact units each include at least one contact element, which cooperates with the other as contact partners. The at least one contact element of the first contact unit is embodied as a hollow contact element. The at least one contact element of the second contact unit is embodied as a shaped contact part that comprises an elevated region that tapers in the direction along a vertical axis. The electrical contact of the at least one hollow contact element with the at least one shaped contact part is provided in the form of a plug connection inside the hollow contact element of the first contact unit.

10 Claims, 2 Drawing Sheets

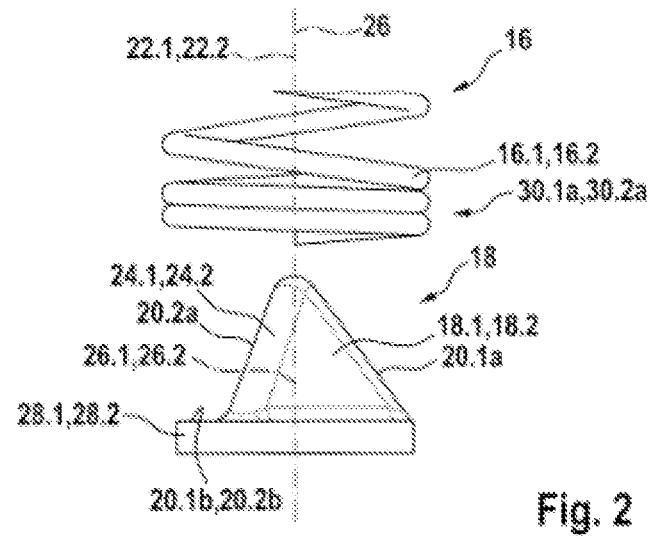
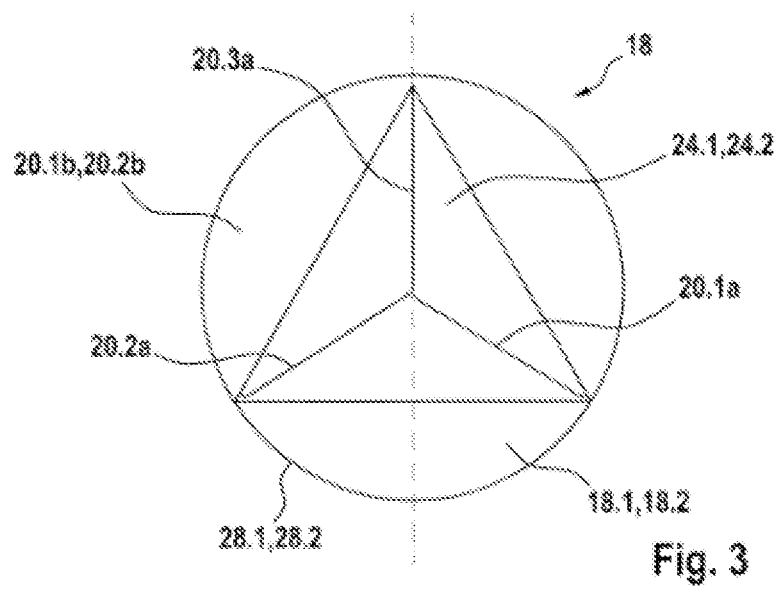

DEVICE FOR ELECTRICALLY CONTACTING ELECTRONIC UNITS

This application claims priority under 35 U.S.C. §119 to patent application no. DE 10 2011 085 856.3, filed on Nov. 7, 2011 in Germany, the disclosure of which is incorporated herein by reference in its entirety.

BACKGROUND

The disclosure resides in a device for electrically contacting a first electronic unit with a second electronic unit.

Devices for electrically contacting electronic components are known in the prior art in different embodiments. In order that the electrical contact between the electronic components is produced in a reliable and secure manner, contact partners are conventionally used in single point pressure contact systems, the contact elements of which comprise planar contact surfaces. However, as the contact surfaces of the two contact partners contact, there is the risk of one contact element migrating sideways from the original contact point as a result of transverse forces since there is no external or internal guide of the contact elements. In the case of large tolerances, there is also the risk that the electrical contact cannot be produced in a reliable manner, as a consequence of which conventionally the fixed contact surface of the two contact partners is over-dimensioned and consequently the material costs are higher and the installation space larger. In addition, impurities adhering to the contact surfaces of the two contact partners prevent a reliable energy transmission and signal transmission.

A sensor component assembly of a brake device is known from DE 199 17 941 A1, by means of which the electrical contact between a first electronic unit, which is embodied as a pressure sensor, with a second electronic unit, which is embodied as an electronic control unit, is produced by way of a device for providing contact. In the case of the brake device described in order to simplify the assembly, an electronic control unit is accommodated in a housing that covers at least one pressure sensor and the electrical connection between the electronic control unit and the pressure sensor is produced during assembly by way of a first contact unit having four contact elements that are embodied as resilient contact pins and a second contact unit having four contact elements that are embodied as contact surfaces. The housing of the electronic control unit is fastened in this case to a hydraulic block of the brake device, in which brake device the at least one pressure sensor is arranged so that the resilient contact pins of the first contact unit are supported at one end with a defined contact pressure between the mutually opposite contact surfaces of the second contact unit. In this case, the resilient contact pins of the first contact unit are guided in guide units that are located in an insulating part, wherein the resilient contact pins comprise in each case a contact sleeve having a contact spring lying therein and at least one contact plunger that is axially displaceable in the contact sleeve and is influenced in the direction in which it is displaced out of the contact sleeve by the contact spring that is embodied as a compression spring. An axial support is provided between the contact sleeve and the contact plunger, by means of which support the contact plunger is retained in its contact sleeve. The resilient contact pin comprising contact sleeve, contact plungers and contact spring already forms in the non-installed state a stable, pre-assembled and consequently easy-to-handle component assembly. However, it is necessary for the components of the resilient contact pin to be produced in an extremely dimensionally stable manner in order to be able to ensure a permanent electrical contact that is not encumbered with problems. This particularly applies if the component assembly is embodied overall in a delicate manner. As a consequence, it is expensive overall using this technology to produce the pre-assembled component assembly comprising contact sleeve, contact spring and contact plungers and even the individual resilient contact pin comprising precision components is relatively expensive.

DE 10 2008 040 173 A1 likewise discloses a sensor component assembly of a brake device having a device for electrically contacting a first electronic unit with a second electronic unit. The device comprises a guiding unit, at least one first contact unit that is guided in the guiding unit and a second contact unit, wherein the contact units for providing the electrical contact comprise in each case at least one contact element, which contact elements cooperate as contact partners.

SUMMARY

The device in accordance with the disclosure for providing the electrical contact of electronic units has in contrast the advantage that the at least one contact element of the first contact unit is embodied as a hollow contact element and the corresponding at least one contact element of the second contact unit is embodied as a shaped contact part that comprises an elevated region that tapers in the direction along a vertical axis, wherein the electrical contact of the at least one hollow contact element with the at least one shaped contact part is provided in the form of a plug connection inside the hollow contact element of the first contact unit. In an advantageous manner, a reliable internal electrical contact and signal transmission is provided between the inner face of the hollow contact element of the first contact unit and the outer face of the shaped contact part of the second contact unit, since the hollow contact element of the first contact unit is guided during the operation in a defined manner towards the shaped contact part of the second contact unit and as a consequence the hollow contact element of the first contact unit cannot migrate sideways even in the case of tolerance deviations.

As a result of the defined internal guide of the two contact units towards each other, the hollow contact element of the first contact unit is already supported at the commencement of and/or during the contact movement by the shaped contact part of the second contact unit both transversely and also longitudinally with respect to its direction of movement and as a consequence is resistant both to transverse forces and also to longitudinal forces. This support is provided even in the case of small installation spaces and tolerance deviations since the contact elements in accordance with the disclosure of the two contact units can engage one inside the other even at the commencement of the contact movement. As a consequence, a high level of mechanical flexibility and a high level of reliability of the electrical contact are already provided at the commencement of the contacting procedure. Consequently, it follows in an advantageous manner that it is not necessary for the contact partners in accordance with the disclosure to be manufactured and/or assembled automatically in a dimensionally stable manner in order to ensure a permanent, electrical contact that is not encumbered with problems. This has the advantage that in the case of the contacting device in accordance with the disclosure the high construction cost and material cost can be reduced, whereby the production costs can be lowered. In addition, the contacting device in accordance with the disclosure ensures a reliable transmission of energy and signals between the contact partners even in the case where the cleanliness conditions are not ideal, for example, if dirt contaminates the contact sites. In addition, the contacting device in accordance with the disclosure is embodied in such a manner that this ensures a continuously good transmission of electrical signals in a temperature range of −40° C. to 120° C. Since ideal mechanical conditions prevail in the contact region, wear is insignificantly small. As a result of the good temperature resistant properties and the comparatively small amount of wear, the device for providing the electrical contact has in an advantageous manner a long useful life and/or serviceable life. As a consequence, a reliable transmission of energy and signals between the contact partners is ensured in a simple and cost-effective manner.

By virtue of the features and further developments disclosed in the dependent claims, advantageous improvements of the device for providing the contact are possible.

In an advantageous embodiment of the disclosure, the tapering elevated region of the second contact unit is embodied as a tetrahedron or pyramid. As a consequence, the tapering elevated region ensures in an advantageous manner that the two contact partners are reliably guided and contacted even at the commencement of the contacting procedure and that during the course of the contacting procedure the hollow contact element of the first contact unit is reliably internally guided on the shaped contact part of the second contact unit. In addition, by virtue of the two contact elements being internally guided with respect to each other, the contact elements are prevented from migrating sideways away from the original contact point, since any transverse forces that may occur and act on the contact elements can be compensated for by means of the internal guide. The height of the tapering elevated region that is embodied as a tetrahedron or pyramid does not itself influence the installation space since the elevated region disappears inside the hollow contact element of the first contact unit and as a consequence the plug connection is embodied in such a manner as to optimize the installation space. In contrast to a planar contact surface of the contact element of the prior art, it is possible by virtue of the inclined lateral edges of the tetrahedron in the case of an identical amount of normal force acting upon the contact partner in an advantageous manner to provide a greater surface pressing in the contact region between the hollow contact element of the first contact unit and the shaped contact part of the second contact unit. Consequently, a gas-tight contact is possible even in the case of comparatively low normal forces, as a consequence of which the reliability of the contact is ensured, even if a part of the contact surface of the contact partner is contaminated. In addition, the embodiment in accordance with the disclosure of the contacting device ensures a greater contact surface with the smallest installation space, as a consequence of this a reliable multi-point contact is ensured and the probability of a reliable transmission of energy and signals of the contact partners is considerably increased.

In a further advantageous embodiment of the contacting device in accordance with the disclosure, a central axis of the tetrahedron or pyramid aligns with the vertical axis of the hollow contact element. As a consequence, in an advantageous manner the prerequisite for a reliable electrical contact and signal transmission is provided structurally since due to the matching position of the central axes and/or coaxial arrangement of the two contact elements the hollow contact element of the first contact unit can be guided in a defined manner with respect to the shaped contact part of the second contact unit.

In a further advantageous embodiment of the contacting device in accordance with the disclosure, the tapering elevated region of the second contact unit is arranged on a carrier plate. As a consequence, when assembling the shaped contact part of the second contact unit a geometrically defined position with respect to the hollow contact element of the first contact unit is ensured. In an advantageous manner, the diameter of the shaped contact part is almost half the size in comparison to the current contact elements of the prior art and consequently requires less surface area, so that the contacting device can be embodied overall in a more compact manner. When the size is optimized with respect to the installation space, the shaped contact part provides a large contact surface area for the hollow contact element of the first contact unit which comprises the peripheral surface of the tapering elevated region and the base surface of the carrier plate. The diameter of the carrier plate is expediently defined in dependence upon the edge length of the tetrahedron or pyramid, as a consequence of which it is possible to ensure a multi-point contacting arrangement in the case of the smallest installation space by way of the tetrahedron-shaped or pyramid-shaped contact surface. Despite the dimensionally small embodiment of the shaped contact part, the space-saving and/or installation space-optimized contacting device in accordance with the disclosure ensures the advantages of a reliable transmission of energy and signals. It is particularly advantageous that the carrier plate is embodied in a cylindrical manner and the diameter of the carrier plate is equal to the outer diameter of the hollow contact element. As a consequence, it is possible in an advantageous manner in the case of constant tolerance specifications to minimize the structural sizes of the two contact partners and nonetheless a high level of reliability of the electrical contact is ensured. This has the significant advantage that a shaped contact part of the contacting device in accordance with the disclosure that is conventionally electrolytically coated with a precious metal, such as gold, silver or platinum, and has been optimized with respect to its structural size can be produced in a particularly cost-effective manner in comparison to current contact elements of the current prior art. In particular, in comparison to the current size of the contact element, the surface area of the shaped contact part can be reduced by half, so that the material costs in the case of the contacting device in accordance with the disclosure can be considerably reduced.

In a further embodiment of the contacting device in accordance with the disclosure, the hollow contact element of the first contact unit is embodied in a cylindrical and elastic manner. The cylindrical embodiment of the first contact unit is particularly advantageous since this can be mass produced in a particularly cost-effective and simple manner and it is not possible to make an assembly error when installing it in the contacting device. Since the hollow contact element comprises in addition elastic properties, additional components can be omitted, as a consequence of which material costs and assembly costs are avoided. Preferably, the hollow contact element of the first contact unit is embodied as a helical spring or sleeve. In particular, the embodiment as a cost-effective helical spring renders possible a simple implementation of the elastic properties and a rapid and simple assembly. In addition, the embodiment as a helical spring or sleeve also renders it possible to implement the corresponding installation space in a correspondingly simple manner as a simple bore that can be produced rapidly and in a cost-effective manner.

In a further advantageous embodiment of the contacting device in accordance with the disclosure, the end region of the helical spring is embodied in a reinforced manner with in each case at least two spring windings that are close wound. As a consequence, it is possible in a simple and cost-effective manner to provide a simplified structure and consequently an improvement in the current carrying capacity and the guiding properties of the hollow contact element of the first contact unit. As a consequence, the reliability of the transmission of energy and signals between the contact partners is further improved.

A preferred embodiment of the contacting device in accordance with the disclosure provides that the contact elements are embodied in such a manner that the electrical contact is provided at at least two contact sites that are embodied in a point-shaped manner and/or in a linear manner and/or in a planar manner. In an advantageous manner, the contacting device in accordance with the disclosure renders possible a simultaneous contact between the contact partners at a plurality of contact sites and consequently ensures a reliable transmission of energy and signals between the contact partners, even when the cleanliness conditions are not ideal and/or surfaces of the contact elements are contaminated. In the case of a multi-point contacting arrangement, the risk of a malfunction as a result of contamination reduces since it is unlikely that contaminants simultaneously block a transmission of energy and signals at all contact sites, which contaminants could lead to a failure of the contacting device in accordance with the disclosure. Non-ideal cleanliness conditions prevail, for example, if dirt contaminates the contact sites. As a result of the geometry of the contact partners, the contact points are defined by the edge geometry of the tetrahedron and by the radius of the helical spring and fixed in place. Any sideways migration as a result of influencing transverse forces away from the original contact point is prevented by means of the internal guiding of the two contact partners, as a consequence of which a permanent electrical multi-point contacting arrangement that is not encumbered with problems is ensured and the electronic units always function in a reliable and failure-free manner.

A preferred embodiment of the contacting device in accordance with the disclosure resides in an embodiment of the contacting device as a pressure contact system. In an advantageous manner, the contacting device in accordance with the disclosure ensures space-saving, reliably closed electrical contacts and consequently a secure and reliable transmission of energy and signals both in the case of particularly small spatial conditions and also in the case of contaminated contact surfaces of the contact elements.

BRIEF DESCRIPTION OF THE DRAWINGS

Advantageous embodiments of the disclosure are illustrated in the drawings and described hereinunder. Like reference numerals in the drawings designate like components and/or elements that perform like and/or similar functions.

FIG. 2 illustrates a detailed lateral view of the contact element of the first contact unit and of the contact element of the second contact unit prior to the contact being provided.

FIG. 3 illustrates a plan view of the contact element of the second contact unit shown in FIG. 2.

DETAILED DESCRIPTION

Figure 1:
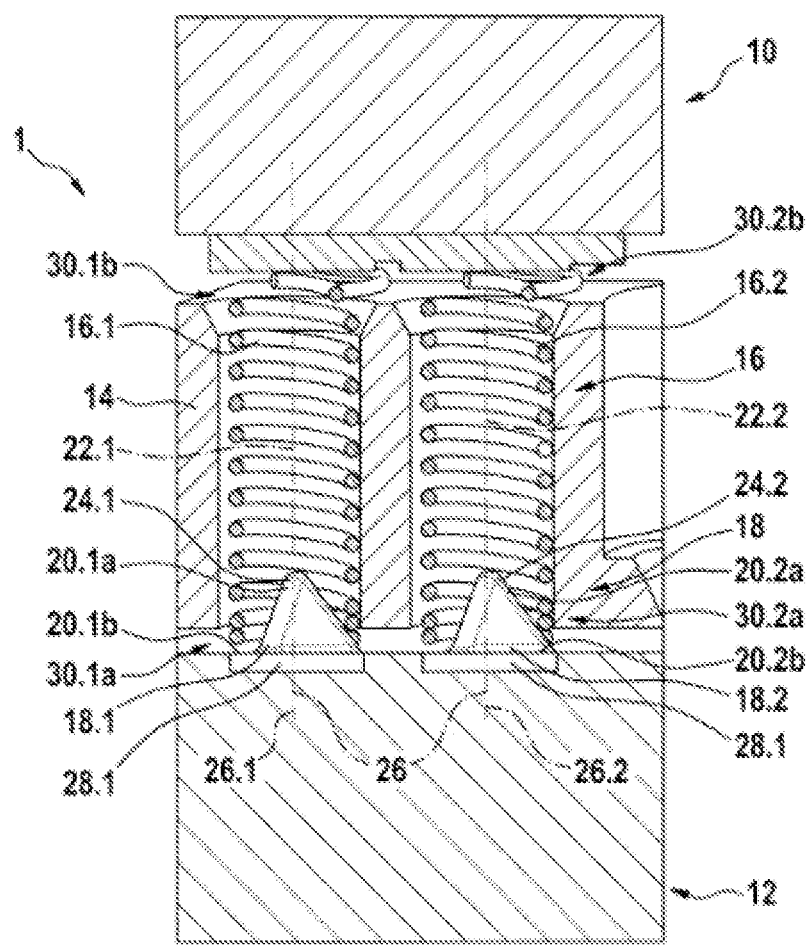
FIG. 1 illustrates a schematic perspective cross-sectional view of a device in accordance with the disclosure for electrically contacting electronic units, which device comprises a first contact unit and a second contact unit, which first and second contact units comprise in each case contact elements, which contact elements cooperate as contact partners.

FIG. 1 illustrates a device 1 in accordance with the disclosure for electrically contacting a first electronic unit 10 with a second electronic unit 12. Electronic units 10, 12 of this type are used, for example, in electronic systems for technologies relating to safety in a vehicle, such as an anti-lock brake system (ABS), an electronic stabilizing program (ESP), an electro-hydraulic brake (EHB), a traction control system (TCS) or an anti-slip regulation system (ASR). In the present exemplary embodiments, the device 1 is for contacting a contact system for an electronic stabilizing program (ESP) in a vehicle, wherein the first electronic unit 10 comprises an electronic control unit of the vehicle, which electronic control unit is embodied as a control unit, and the second electronic unit 12 comprises a pressure sensor unit of the ESP system.

As is evident from FIGS. 1 to 3, the device 1 for electrically contacting the first electronic unit 10 with the second electronic unit 12 comprises a guiding unit 14, at least one first contact unit 16 that is guided in the guiding unit 14 and at least one second contact unit 18. The contact units 16, 18 for providing the contact comprise in each case at least one contact element 16.1, 16.2, 18.1, 18.2, which contact elements cooperate as contact partners, wherein the contact units 16, 18 in the present exemplary embodiment comprise in accordance with FIG. 1 in each case two contact elements 16.1, 16.2, 18.1, 18.2.

In order to ensure a reliable transmission of energy and signals between the contact partners and to ensure a multi-point contacting arrangement that is optimized with regard to the installation space and has the capacity to compensate for tolerances, the contact element 16.1, 16.2 of the first contact unit 16 is embodied as a hollow contact element and the corresponding contact element 18.1, 18.2 of the second contact unit 18 is embodied as a shaped contact part. The contact element 18.1, 18.2 of the second contact unit 18 comprises an elevated region 24.1, 24.2 that tapers in the direction along a vertical axis 26 of the hollow contact element 16.1, 16.2, wherein the electrical contact of the at least one hollow contact element 16.1, 16.2 with the at least one shaped contact part 18.1, 18.2 is provided in the form of a plug connection inside the hollow contact element 16.1, 16.2 of the first contact unit 16.

The tapering elevated region 24.1, 24.2 of the second contact unit 18 is embodied as a tetrahedron or pyramid, wherein a central axis 26.1, 26.2 of the tetrahedron or pyramid aligns with the vertical axis 26 of the hollow contact element 16.1, 16.2. Consequently, the tip of the tetrahedron or pyramid is structurally always arranged in the correct position with respect to the central axis 22.1, 22.2 of the corresponding hollow contact element 16.1, 16.2 of the first contact unit 16 or with respect to the vertical axis 26. In the present exemplary embodiment, the shaped contact part 18.1, 18.2 of the second contact unit 18 is embodied as a tetrahedron.

In order to provide additional stability of the shaped contact part 18.1, 18.2, the tapering elevated region 24.1, 24.2 of the second contact unit 18 is arranged on a carrier plate 28.1, 28.2. The carrier plate 28.1, 28.2 is embodied in a cylindrical manner and the diameter of the carrier plate 28.1, 28.2 corresponds to the outer diameter of the hollow contact element 16.1, 16.2. The central axis of the cylindrical carrier plate 28.1, 28.2 is identical to the central axis 26.1, 26.2 of the tetrahedron or pyramid and consequently likewise aligns with the vertical axis 26 of the hollow contact element 16.1, 16.2. Consequently, in an advantageous manner it is not possible to make any errors during the assembly of the shaped contact part 18.1, 18.2.

The contact elements 16.1, 16.2, 18.1, 18.2 are embodied in such a manner that the electrical contact is provided at at least two contact sites 20.1a, 20.2a, 20.3a, 20.1b, 20.2b that are embodied in a point-shaped manner and/or in a linear manner and/or in a planar manner. Preferably, in the case of an ideal symmetrical contacting procedure the contact between the two contact partners is initially provided by way of the edges of the tapering elevated region 24.1, 24.2 and/or by way of the surface of the carrier plate 28.1, 28.2 and consequently energy and signals are transmitted by way of at least two contact sites 20.1*a*, 20.2*a*, 20.3*a* or a contact surface 20.1*b*, 20.2*b*. In the case of a non-ideal symmetrical contacting procedure and/or where the contact partners are offset with respect to each other, the contact is provided depending upon the offset of the two contact partners at the edges of the tetrahedron and/or pyramid at different heights by way of at least one contact site 20.1*a*, 20.2*a*, 20.3*a*, wherein at the commencement of the contacting procedure a contact is provided between the contact partners at at least one contact site 20.1*a*, 20.2*a*, 20.3*a* and at the end of the contacting procedure at at least two contact sites 20.1*a*, 20.2*a*, 20.3*a*.

The type of electrical contact is dependent upon the ratio of the diameter of the carrier plate 28.1, 28.2 with respect to the edge length of the tetrahedron. In the present exemplary embodiment, the diameter and/or the radius of the carrier plate 28.1, 28.2 are defined in dependence upon the edge length of the tetrahedron. In this case, the edge length of the tetrahedron is at a ratio of $\sqrt{3}/3$ of the radius of the last spring winding. If the edge length of the tetrahedron is greater than the ratio $\sqrt{3}/3$ of the radius of the last spring winding, the hollow contact element 16.1, 16.2 of the first contact unit 16 does not lie on the base surface of the shaped contact part 18.1, 18.2 of the second contact unit 18, on the contrary it lies on the edges of the tetrahedron and forms there a contact site 20.1*a*, 20.2*a*, 20.3*a*. Consequently, at least one two-point contacting arrangement is ensured and as a consequence a secure and reliable transmission of energy and signals between the contact partners is ensured. Conversely, if the edge length of the tetrahedron is smaller than the ratio $\sqrt{3}/3$ of the radius of the last spring winding, the hollow contact element 16.1, 16.2 of the first contact unit 16 lies on the base surface of the shaped contact part 18.1, 18.2 of the second contact unit 18 and forms there a linear-shaped and/or planar contact site 20.1*b*, 20.2*b*.

In order to embody the contacting device preferably as a pressure contact system, the hollow contact element 16.1, 16.2 of the first contact unit 16 is embodied as a helical spring or sleeve. In the present exemplary embodiment the first contact unit 16 is embodied in accordance with FIGS. 1 and 2 as a helical spring, which can be influenced by pressure, or compression spring, wherein the end region 30.1*a*, 30.1*b*, 30.2*a*, 30.2*b* of the helical spring is embodied in a reinforced manner with in each case at least two spring windings that are close wound. Preferably, the hollow contact element 16.1, 16.2 of the first contact unit 16 is embodied in a cylindrical and elastic manner, as a consequence of which in comparison to the prior art it is necessary to assemble only one individual component as a contact element 16.1, 16.2 into the guiding element 14 of the contacting device in accordance with the disclosure.

What is claimed is:

1. A device for electrically contacting a first electronic unit with a second electronic unit, comprising:
    a guiding unit;
    at least one first contact unit that is guided in the guiding unit; and
    a second contact unit,
    wherein each of the contact units includes at least one contact element with respective contact elements cooperating as contact partners,
    wherein the at least one contact element of the first contact unit is embodied as a hollow contact element and the corresponding at least one contact element of the second contact unit is embodied as a shaped contact part that includes an elevated region that tapers in a direction along a vertical axis, and
    wherein the electrical contact of the at least one hollow contact element with the at least one shaped contact part is provided in the form of a plug connection inside the hollow contact element of the first contact unit.

2. The contacting device according to claim 1, wherein the tapering elevated region of the second contact unit is embodied as a tetrahedron or pyramid.

3. The contacting device according to claim 2, wherein a central axis of the tetrahedron or pyramid aligns with the vertical axis of the hollow contact element.

4. The contacting device according to claim 1, wherein the tapering elevated region of the second contact unit is arranged on a carrier plate.

5. The contacting device according to claim 4, wherein the carrier plate is embodied in a cylindrical manner and a diameter of the carrier plate corresponds to an outer diameter of the hollow contact element.

6. The contacting device according to claim 1, wherein the hollow contact element of the first contact unit is embodied in a cylindrical and elastic manner.

7. The contacting device according to claim 1, wherein the hollow contact element of the first contact unit is embodied as a helical spring or sleeve.

8. The contacting device according to claim 7, wherein an end region of the helical spring is embodied in a reinforced manner with at least two spring windings that are close wound.

9. The contacting device according to claim 1, wherein the contact elements are embodied in such a manner that the electrical contact is provided at at least two contact sites that are embodied in one or more of a point-shaped manner, a linear manner, and a planar manner.

10. The contacting device according to claim 1, wherein the contacting device is embodied as a pressure contact system.

* * * * *